(12) United States Patent  (10) Patent No.: US 7,615,722 B2
Govorkov et al.  (45) Date of Patent: Nov. 10, 2009

(54) AMORPHOUS SILICON CRYSTALLIZATION USING COMBINED BEAMS FROM OPTICALLY PUMPED SEMICONDUCTOR LASERS

(75) Inventors: Sergei V. Govorkov, Los Altos, CA (US); R. Russel Austin, Cool, CA (US); Joerg Ferber, Angerstein (DE)

(73) Assignee: Coherent, Inc., Santa Clara, CA (US)

( * ) Notice: Subject to any disclaimer, the term of this patent is extended or adjusted under 35 U.S.C. 154(b) by 500 days.

(21) Appl. No.: 11/487,798

(22) Filed: Jul. 17, 2006

(65) Prior Publication Data
US 2008/0014685 A1 Jan. 17, 2008

(51) Int. Cl.
H01L 21/00 (2006.01)
(52) U.S. Cl. .................. 219/121.65; 219/121.76; 372/99; 372/101
(58) Field of Classification Search ............ 219/121.65, 219/121.73–121.76; 372/98, 99, 101
See application file for complete search history.

(56) References Cited

U.S. PATENT DOCUMENTS

| | | | |
|---|---|---|---|
| 4,911,711 A * | 3/1990 | Telfair et al. ................. 606/5 |
| 5,676,866 A | 10/1997 | in den Baumen et al. ........ 219/121.77 |
| 6,172,329 B1 | 1/2001 | Shoemaker et al. .... 219/121.69 |
| 6,285,702 B1 | 9/2001 | Caprara et al. ................. 372/92 |
| 6,478,452 B1 | 11/2002 | Richardson et al. ......... 362/268 |
| 6,537,863 B1 * | 3/2003 | Jung ........................... 438/166 |
| 6,563,843 B1 * | 5/2003 | Tanaka ........................... 372/9 |
| 6,612,719 B2 | 9/2003 | Richardson et al. ......... 362/268 |
| 6,621,044 B2 * | 9/2003 | Jain et al. ................ 219/121.7 |
| 6,650,480 B2 * | 11/2003 | Tanaka ....................... 359/618 |
| 6,693,257 B1 * | 2/2004 | Tanaka .................. 219/121.76 |
| 6,773,142 B2 | 8/2004 | Rekow ....................... 362/259 |
| 6,795,456 B2 | 9/2004 | Scaggs ......................... 372/23 |
| 6,898,216 B1 | 5/2005 | Kleinschmidt ................. 372/9 |
| 6,909,546 B2 * | 6/2005 | Hirai ........................... 359/566 |
| 6,943,086 B2 * | 9/2005 | Hongo et al. ............... 438/308 |
| 7,009,140 B2 * | 3/2006 | Partio et al. ............ 219/121.65 |
| 7,016,393 B2 | 3/2006 | Anikitchev et al. ......... 372/101 |
| 7,132,204 B2 * | 11/2006 | Jung ............................. 430/5 |
| 7,135,390 B2 | 11/2006 | Tanaka ....................... 438/487 |

(Continued)

FOREIGN PATENT DOCUMENTS

DE 103 01 482 A1 7/2004

(Continued)

OTHER PUBLICATIONS

In re U.S. Appl. No. 11/238,202, filed Sep. 29, 2005, by Sergei V. Govorkov et al., entitled "Speckle Reduction in Laser Illuminated Projection Displays Having a One-Dimensional Spatial Light Modulator."

(Continued)

*Primary Examiner*—Samuel M Heinrich
(74) *Attorney, Agent, or Firm*—Morrison & Foerster LLP

(57) ABSTRACT

An amorphous silicon layer on a glass substrate is crystallized by concentrating CW radiation from a number of OPS-lasers into a line of light on the layer. The layer is moved with respect to the line of light to control the dwell time of the line on any location on the layer and to crystallize an extended area of the layer.

17 Claims, 12 Drawing Sheets

U.S. PATENT DOCUMENTS

| | | | |
|---|---|---|---|
| 7,244,028 B2 * | 7/2007 | Govorkov et al. | 353/37 |
| 7,268,062 B2 | 9/2007 | Tanaka et al. | 438/487 |
| 7,465,648 B2 * | 12/2008 | Tanaka | 438/487 |
| 2002/0196414 A1 * | 12/2002 | Manni et al. | 353/31 |
| 2003/0112322 A1 | 6/2003 | Tanaka | 347/241 |
| 2004/0040938 A1 | 3/2004 | Yamazaki et al. | 219/121.6 |
| 2004/0120050 A1 | 6/2004 | Tsukihara et al. | 359/629 |
| 2005/0142450 A1 * | 6/2005 | Jung | 430/5 |
| 2005/0157762 A1 | 7/2005 | DeMaria et al. | 372/9 |
| 2005/0270650 A1 | 12/2005 | Tsukihara et al. | 359/618 |
| 2005/0280821 A1 | 12/2005 | Fiolka et al. | 356/399 |
| 2006/0126022 A1 | 6/2006 | Govorkov et al. | 353/31 |

FOREIGN PATENT DOCUMENTS

JP     02003077809 A *   3/2003

OTHER PUBLICATIONS

In re U.S. Appl. No. 11/350,514, filed Feb. 9, 2006, by Roman Windpassinger et al., entitled "Method and Apparatus for Coupling Laser Beams."

In re U.S. Appl. No. 60/775,459, filed Feb. 22, 2006, by Holger Graefe et al., entitled "Method for Homogenizing a Laser Beam."

In re U.S. Appl. No. 60/812,877, filed Jun. 12, 2006, by Joel Fontanella et al., entitled "Incoherent Combination of Laser Beams."

* cited by examiner

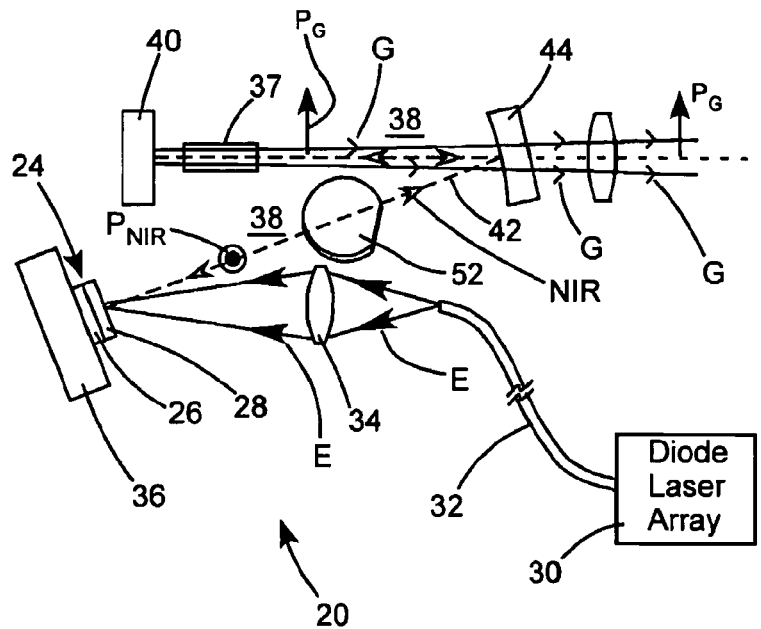
FIG. 1
(Prior Art)
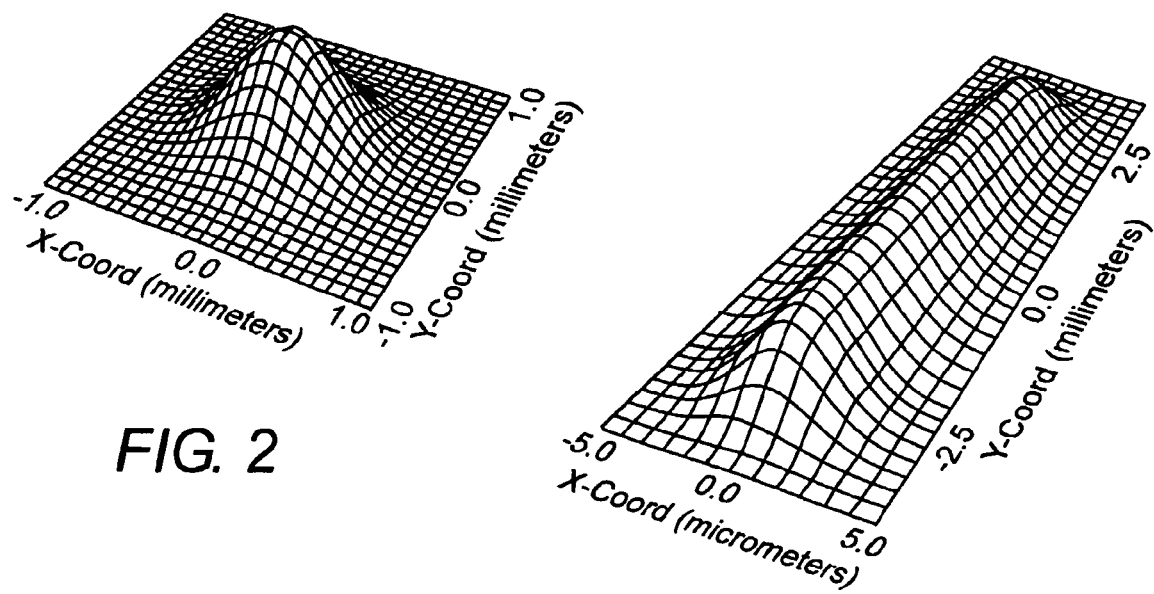
FIG. 2
FIG. 3

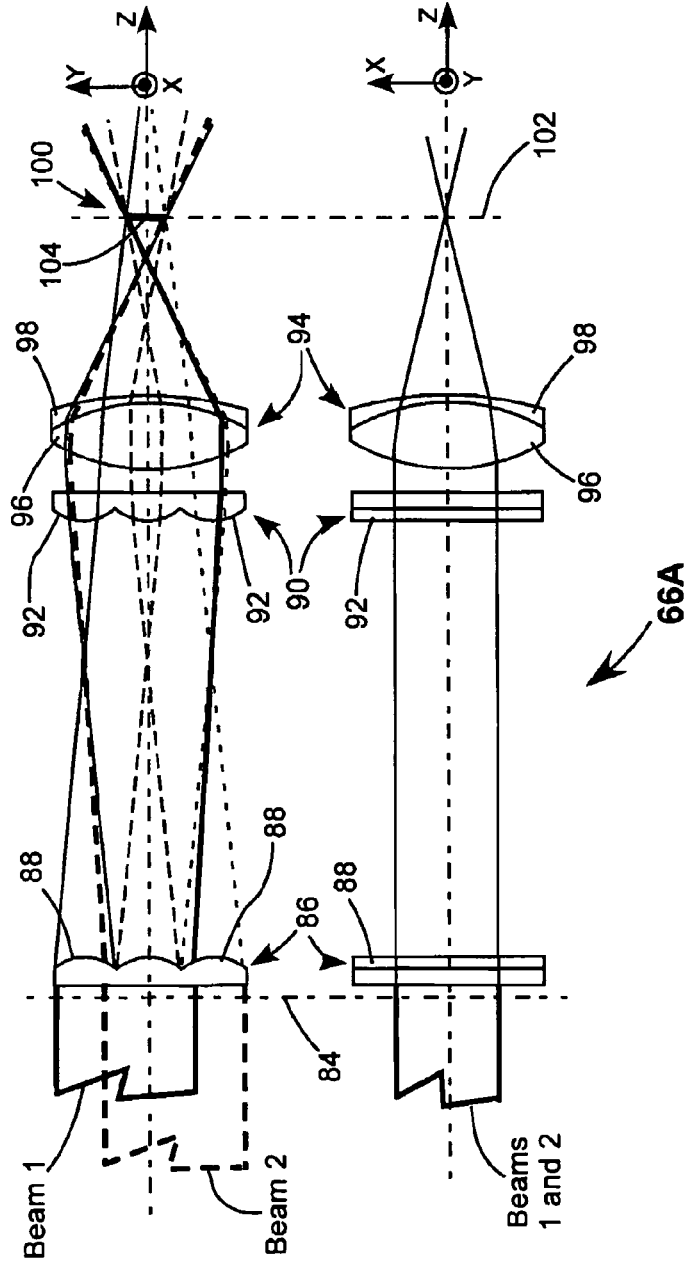
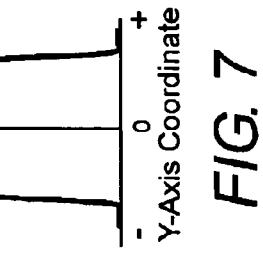
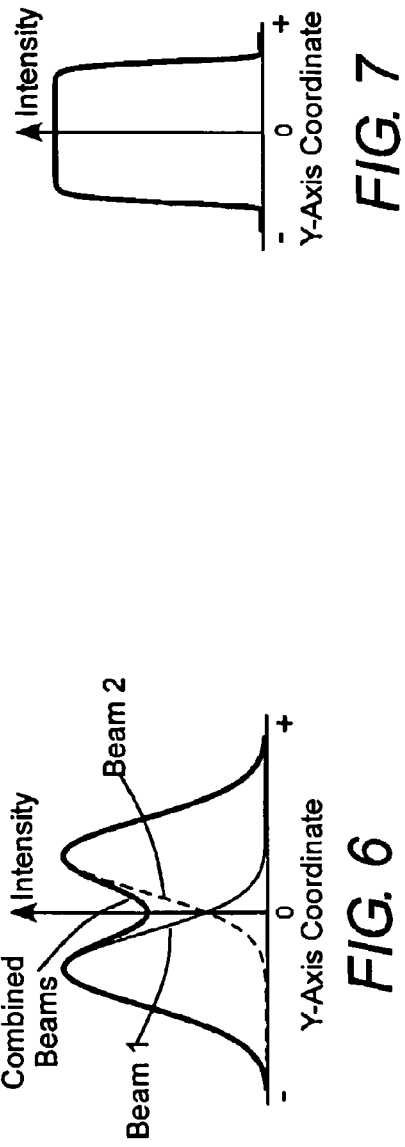
FIG. 5A
FIG. 5B
FIG. 6
FIG. 7

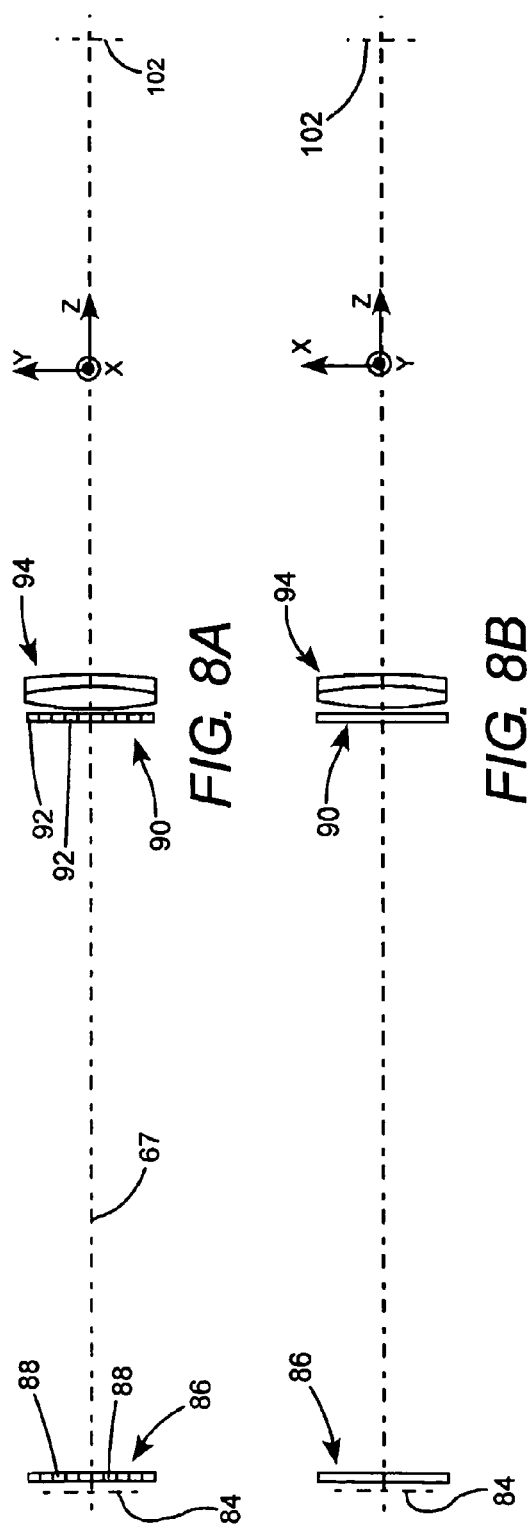
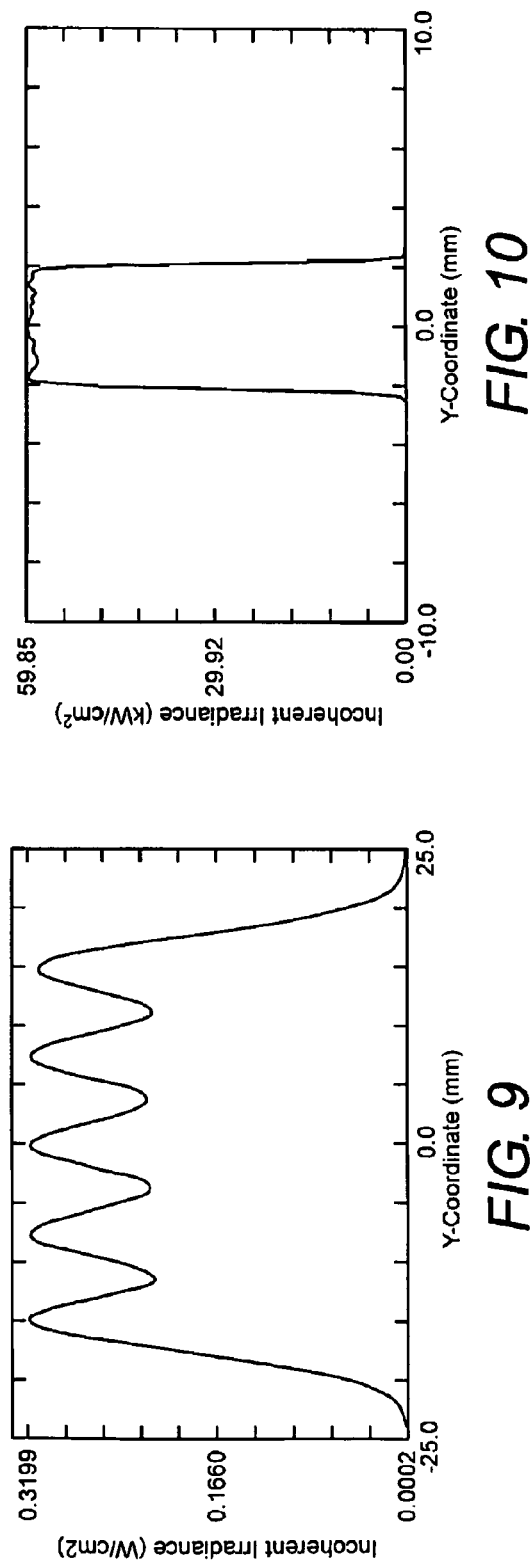

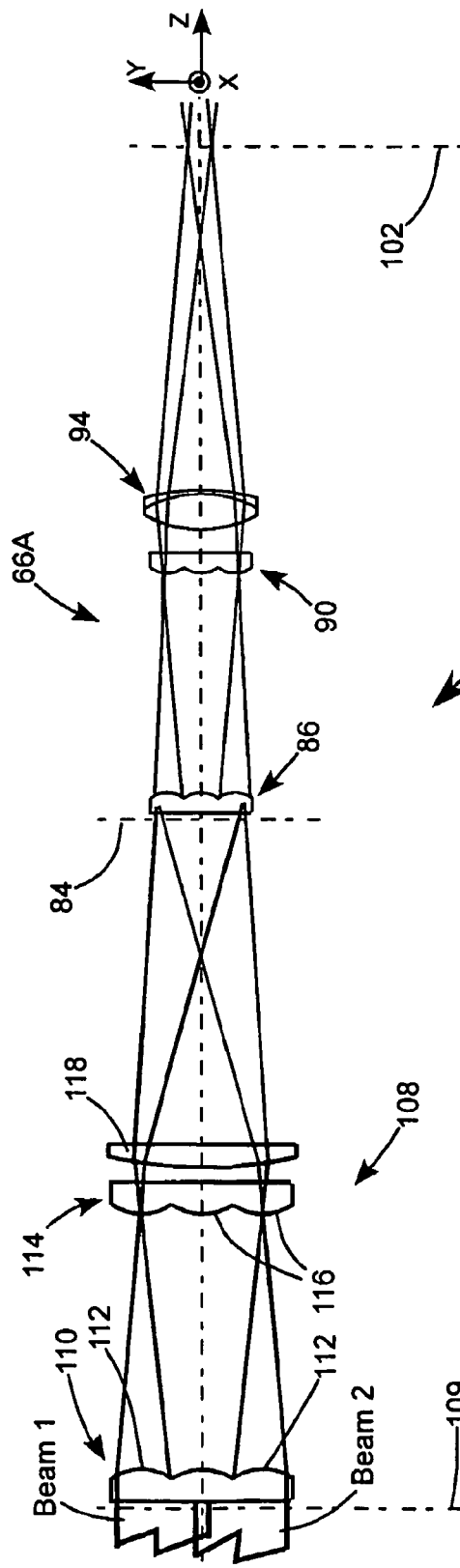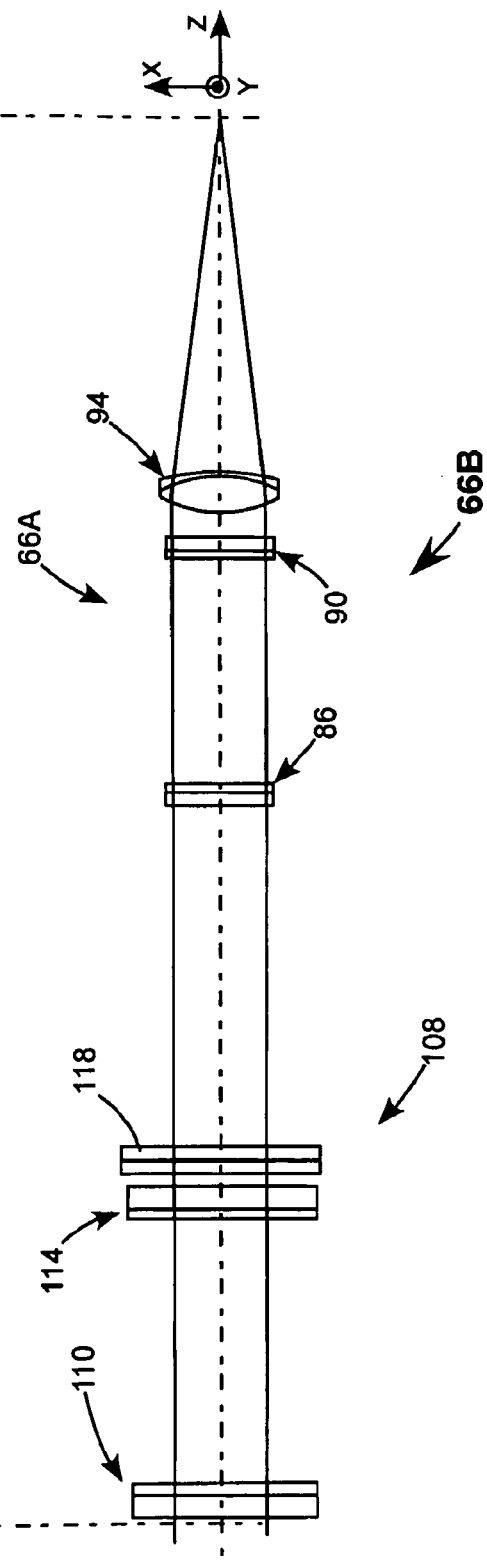

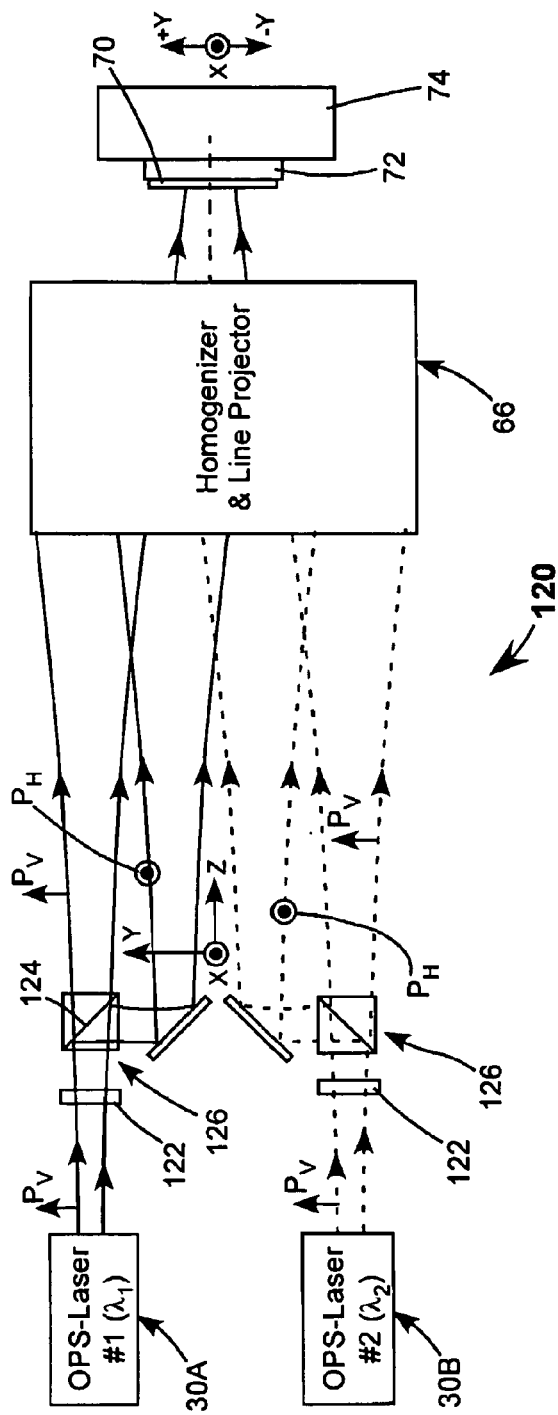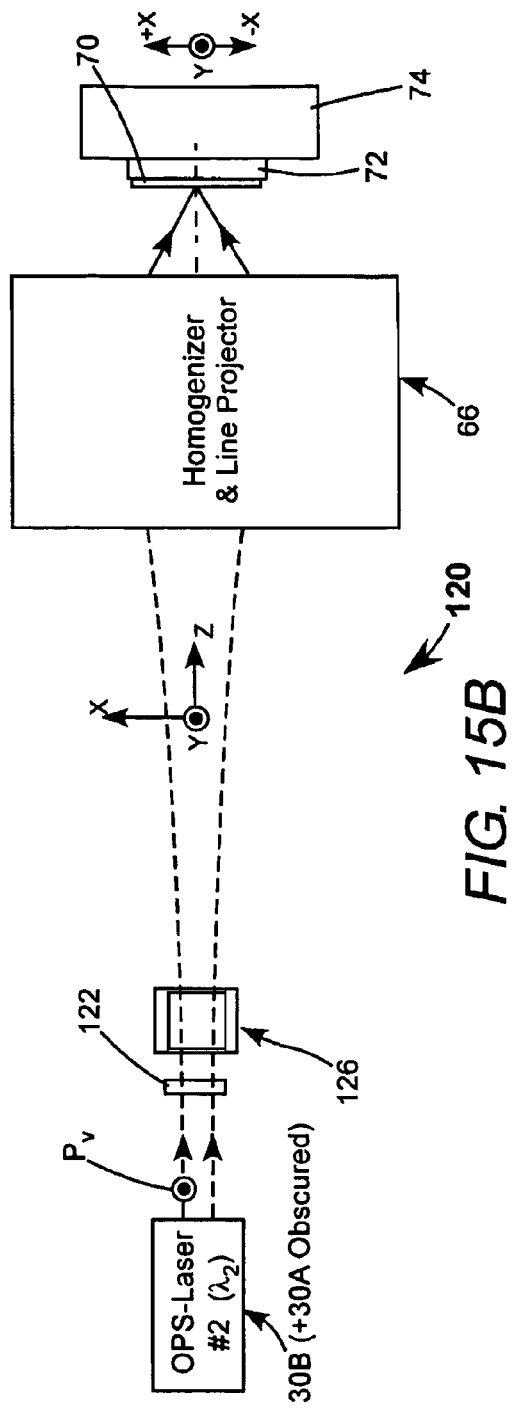

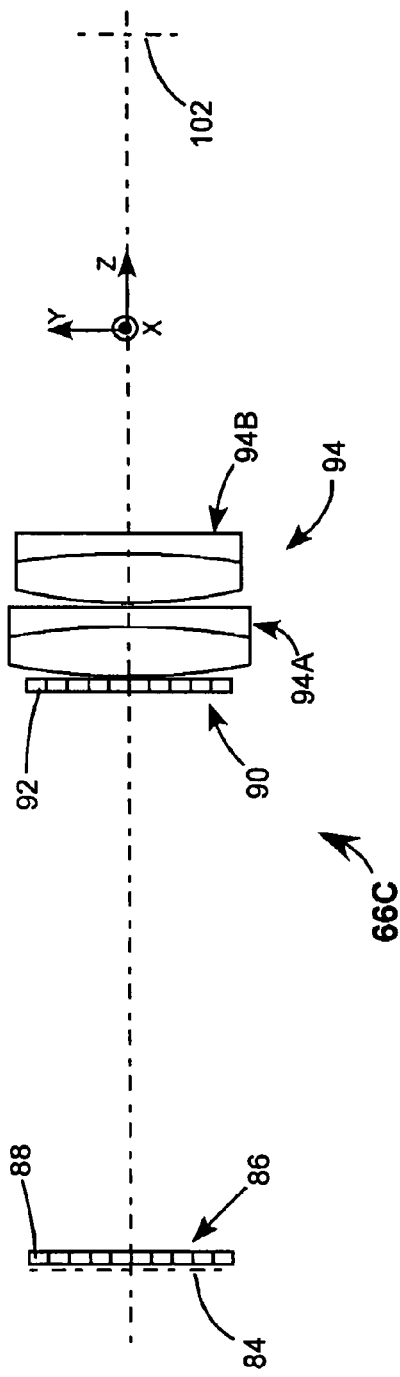
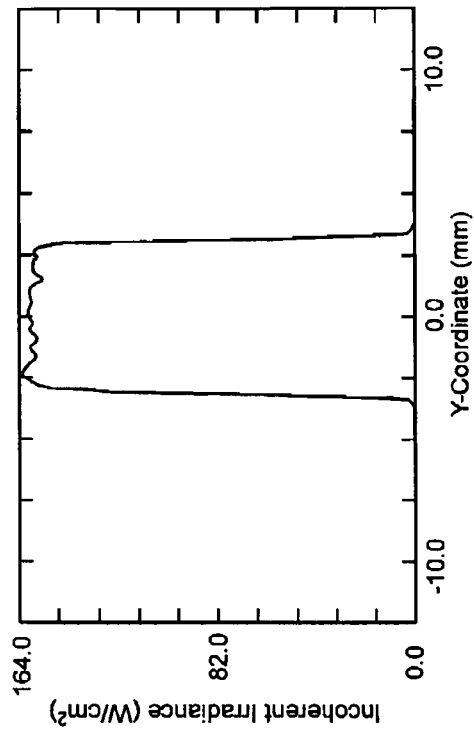
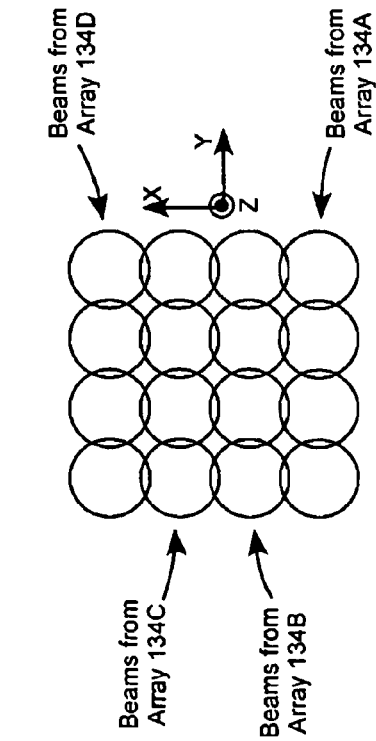
FIG. 18
FIG. 19
FIG. 17

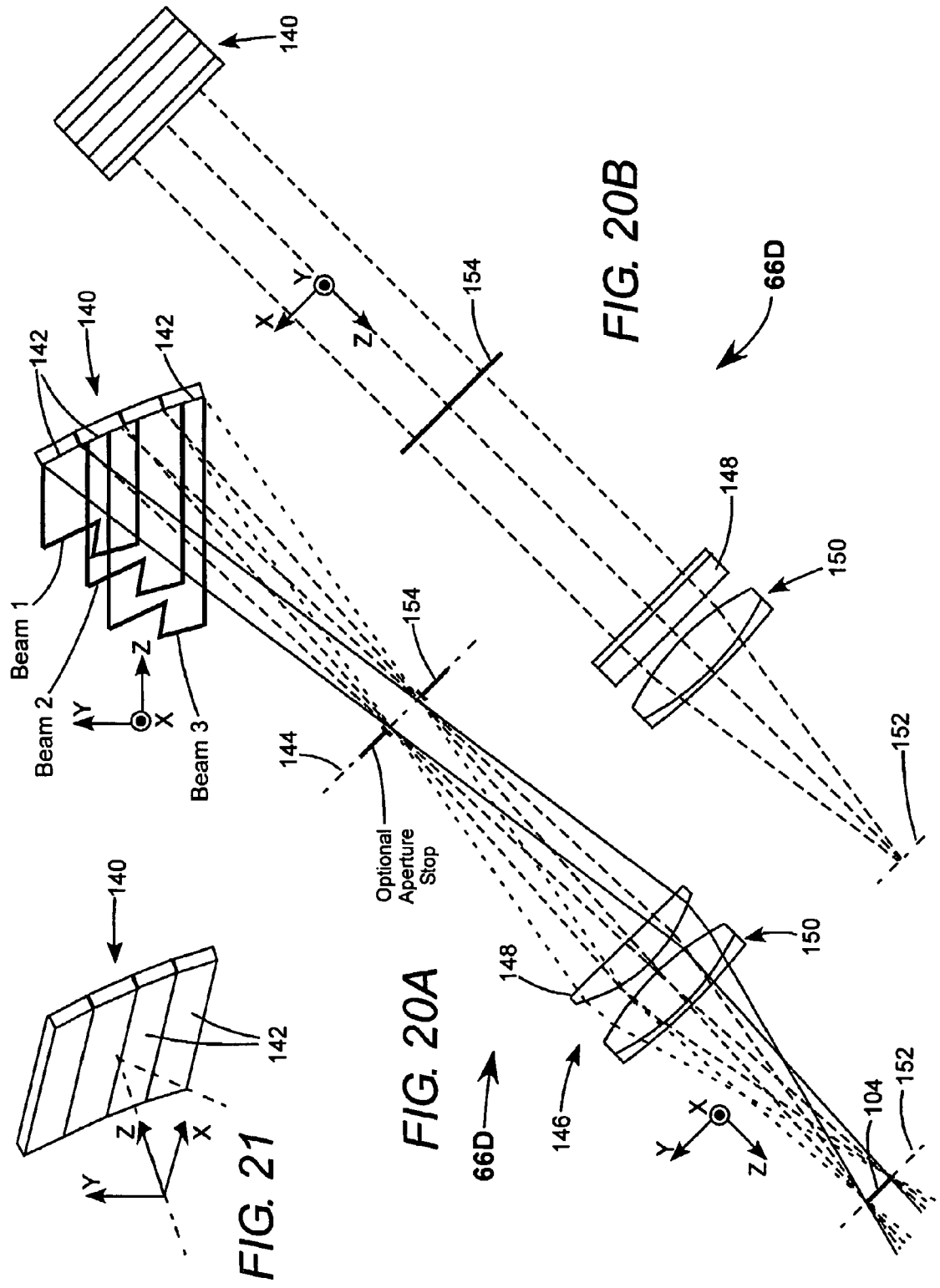

AMORPHOUS SILICON CRYSTALLIZATION USING COMBINED BEAMS FROM OPTICALLY PUMPED SEMICONDUCTOR LASERS

TECHNICAL FIELD OF THE INVENTION

The present invention relates in general to crystallization of amorphous silicon layers deposited on glass substrate. The invention relates in particular to effecting such crystallization by irradiating such amorphous silicon layers with laser radiation

DISCUSSION OF BACKGROUND ART

Crystallization of an amorphous silicon layer on glass is a step in the process of making a thin film transistor (TFT) array for a flat panel display. Currently, in routine commercial practice, this is carried out by irradiating the amorphous silicon layer, deposited on a glass substrate, with repetitively pulsed ultraviolet (UV) laser radiation. In commercial practice, the UV laser radiation is typically supplied by an excimer or exciplex laser. UV radiation is strongly absorbed by silicon, providing efficient conversion of the UV radiation into heat needed to melt the amorphous silicon to initiate crystallization.

There are two problems in using excimer laser radiation for silicon crystallization. These problems are currently tolerated in the absence of any cost effective alternative to excimer laser radiation. One problem is the excimer lasers themselves. They are expensive to buy and maintain. The gain materials of the lasers include fluorine and chlorine, so that strict attention must be paid to gas containment. The lasers provide gain through pulsed discharges in the lasing gases at pressures greater than one atmosphere. Laser gases must be circulated through the discharges and through cryogenic cleaning systems that are used to keep the gases free of contaminants. The lasers and associated beam projection optics must be carefully vibration-isolated from electrical circuitry used to generate pulse trains for creating the gas discharges, and from motors and pumps used for gas circulation.

Another problem is that the radiation provided by an excimer laser is repetitively pulsed radiation, with the pulses having relatively short, for example tens of nanoseconds, duration. Pulses are delivered at a rate no greater than about 4 kilohertz (kHz). In an amorphous silicon layer exposed to one pulse, amorphous silicon melts, silicon crystals begin to grow in the melt, and then the silicon solidifies before the delivery of the next pulse. The silicon crystals created in a single pulse are too small to provide adequate carrier mobility in a TFT, and crystallization is incomplete. Because of this, exposure to multiple pulses, providing multiple melting a solidifying cycles, is necessary. This causes re-crystallization wherein some crystals provided by one pulse survive and grow and eventually absorb smaller crystals produced by subsequent pulses.

There have been laboratory experiments performed using pulsed radiation having a wavelength of about 532 nm, i.e., radiation in the green region of the visible spectrum, from frequency-doubled solid state lasers such as frequency doubled neodymium doped YAG and yttrium vanadate (Nd:YAG and Nd:YVO$_4$) lasers. These pulses have a typically longer duration. These experiments illustrate, inter-alia, that crystallization is possible at wavelengths that are less strongly absorbed by the silicon than ultraviolet radiation without compromising quality of the crystallization. There still remains a problem that pulsed radiation is needed to provide adequate power.

It has believed that if about 100 Watts or more of continuous wave (CW) radiation having a wavelength in the green or blue spectral region could be concentrated in a line of light having a length of a few millimeters (mm) and a width less than about five micrometers (μm), there would be sufficient radiation intensity in the line of light to quickly melt silicon. The line of light could be scanned over an area of amorphous silicon to be crystallized such that melting and subsequent growth of crystals of adequate size could take place during the dwell time of the line of light on the amorphous layer, i.e., without a need for re-crystallization. Scanning the line would also allow an extended area of amorphous silicon to be crystallized. The intensity of radiation along the line, however, would need to be substantially uniform along the line, for example, within about 5%, or even less, of a nominal value.

CW blue and green radiation can be generated with about 25% or greater electrical-to-optical efficiency by intracavity frequency doubling near infrared (NIR) radiation in an external-cavity, optically pumped (diode-pumped), surface-emitting, semiconductor laser. Such a laser is usually designated an OPS-laser by practitioners of the art. Such a laser includes what is commonly termed an OPS-structure. The OPS-structure includes a mirror structure surmounted by a multilayer surface-emitting semiconductor gain structure. The mirror structure usually functions as an end-mirror of a laser resonator (cavity) in the which the gain structure is located. At a present state of development, such a laser having an average lifetime of five thousand hours or more between services and having a green (second-harmonic) output power between about 10 W and 15 W in a single or a few modes, is available from the Coherent Inc. of Santa Clara, Calif., the assignee of the present invention. Such a laser can have a beam quality defined by an $M^2$ value of about 10 or less. This beam quality would be suitable for projecting an image having a dimension of 5 μm or less. The power output, however, falls well short of what would be needed to provide the target power in a 5 mm×5 μm line.

A primary limit to the output power of an OPS laser is presented by the difficulty of removing heat (from unconverted pump light) from the OPS gain-structure. This limits the pump power that can be applied to a single structure. Proposals have been made to overcome this limitation by including more than one gain-structure in a resonator. One such approach is described in U.S. patent application Ser. No. 11/124,319 filed, May 6, 2005. Practical problems associated with such an approach include matching the gain bands of the gain-structures, and configuring the resonator such that a change in the condition of one OPS-structure, in particular, the flatness of the mirror structure, does not adversely influence the power available from one or more of the other gain-structures. While these problems may eventually be solved, it remains to be seen whether or not the solution of the problems will cause the cost scaling of a multi-gain-structure OPS-laser to exceed the power scaling achieved.

It is believed that CW, visible-wavelength, amorphous silicon crystallization could be made commercially viable if an OPS-laser-based radiation delivery system can be developed that provides adequate laser power without a need to solve problems associated with power scaling individual OPS-lasers. The system, of course, must provide the necessary power while still having sufficient optical quality to project a line having a width of about 5 µm or less.

SUMMARY OF THE INVENTION

The present invention is directed to a method and apparatus for crystallizing an amorphous silicon layer on a transparent substrate. In one aspect the method of the present invention comprises generating a plurality of CW laser beams from a corresponding plurality of external-cavity optically-pumped semiconductor lasers (OPS-lasers). The laser beams are projected onto the silicon layer such that combined radiation of the beams is concentrated in an elongated area in a working plane in which the layer is located. The substrate with the layer thereon is translated with respect to the elongated area.

In another aspect of the invention, apparatus for crystallizing the silicon layer includes a plurality of OPS-lasers for generating a corresponding plurality of CW laser beams. Arrangements are provided for propagating the beams along parallel paths such that each beam at least partially overlaps an adjacent beam to form a combined beam. The apparatus also includes a beam homogenizer and line projector. The combined beam is directed into the beam homogenizer and line projector. The beam homogenizer and line projector is configured and arranged to divide the beams, in an axis transverse to the propagation direction, into a plurality of beam portions and project the beam portions into the elongated area in a manner such that each of the beam portions essentially fills the elongated area.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1 schematically illustrates a prior-art, frequency-doubled external cavity optically pumped semiconductor (OPS) laser suitable for use in silicon crystallization apparatus in accordance with the present invention.

FIG. 2 is a three-dimensional graph schematically illustrating a substantially Gaussian transverse intensity distribution across a beam of frequency doubled-radiation delivered by a frequency-doubled OPS-laser of the type depicted in FIG. 1.

FIG. 3 is a three-dimensional graph schematically illustrating a desired transverse intensity distribution of a line of light for performing silicon crystallization in accordance with the present invention, the line of light being formed from beams from a plurality of frequency-doubled OPS lasers of the type depicted in FIG. 1.

FIG. 5A is a not-to-scale optical layout and ray-trace in the plane of the Y-axis, schematically illustrating a preferred embodiment of a homogenizer and line-projector in accordance with the present invention suitable for use in the apparatus of FIGS. 4A and 4B, the homogenizer and line projector including two spaced-apart arrays of Y-axis cylindrical lenses followed by an aberration corrected positive doublet lens.

FIG. 5B is a not-to-scale optical layout and ray-trace in the plane of the X-axis of the homogenizer and line projector of FIG. 5A.

FIG. 6 is a graph schematically illustrating estimated transverse intensity distribution in the Y-axis direction of a combination of two overlapped, Gaussian, OPS-laser beams in a transverse plane immediately preceding a first of the spaced-apart cylindrical lens arrays of FIGS. 5A and 5B.

FIG. 7 is a graph schematically illustrating estimated transverse intensity distribution in the Y-axis direction of a line of light projected by the homogenizer and line-projector of FIGS. 5A and 5B from the overlapped Gaussian beams of FIG. 6.

FIG. 8A is a near relative scale optical layout and ray trace in the plane of the Y-axis, schematically illustrating an example of the homogenizer and line-projector of FIGS. 5A and 5B, including two Y-axis cylindrical lens arrays followed by an aberration-corrected positive doublet lens.

FIG. 8B is a near relative scale optical layout and ray trace in the plane of the X-axis, schematically illustrating further detail of the homogenizer and line-projector of FIG. 8A.

FIG. 9 is a graph schematically illustrating computed transverse intensity distribution in the Y-axis direction of a combination of five overlapped Gaussian OPS-laser beams in a transverse plane immediately preceding a first of the spaced-apart cylindrical lens arrays of an example of the homogenizer and line projector of FIGS. 8A and 8B.

FIG. 10 is a graph schematically illustrating computed transverse intensity distribution in the Y-axis direction of a line of light projected by the example of the homogenizer and line projector of FIGS. 8A and 8B from the five overlapped Gaussian beams of FIG. 9.

FIG. 11A is a not-to-scale optical layout and ray trace in the plane of the Y-axis, schematically illustrating another preferred embodiment of a homogenizer and line-projector in accordance with the present invention suitable for use in the apparatus of FIGS. 4A and 4B, the homogenizer and line projector including a pre-homogenizer including two spaced arrays of Y-axis cylindrical lenses and a cylindrical positive lens, followed by a homogenizer and line projector including two spaced apart arrays of Y-axis cylindrical lenses and an aberration-corrected spherical positive doublet lens.

FIG. 11B is a not-to-scale optical layout and ray trace in the plane of the X-axis, schematically illustrating further detail of the pre-homogenizer, homogenizer and line projector of FIG. 11B.

FIG. 15A is Y-axis view schematically illustrating another embodiment of silicon crystallization apparatus in accordance with the present invention including two OPS-lasers delivering two output beams each of which is divided into two beams plane-polarized perpendicular to each other, and in which the four beams so produced are directed into a homogenizer and line projector in accordance with the present invention for projecting a line-of-light.

FIG. 15B schematically illustrates the apparatus of FIG. 15B in a second transverse axis thereof (X-axis) perpendicular to the first transverse axis.

FIG. 17 is a view seen generally in the direction 17-17 of FIG. 16 schematically depicting the 4×4 matrix of beams at a point where the beams begin to overlap.

FIG. 18 schematically depicts a preferred optical layout, relatively to scale of a homogenizer and line projector in accordance with the present invention arranged to receive a 4×4 beam matrix, the homogenizer and line projector being similar to the homogenizer and line projector of FIGS. 8A-B but including first and second arrays of ten Y-axis cylindrical lenses followed by an aberration-corrected catalog stock lens consisting of two positive doublet lenses.

FIG. 19 is a graph schematically illustrating incoherent irradiance along the Y-axis of a line projected by the homogenizer and line projector of FIG. 18 from a 4×4 array of 16 beams with the beams substantially overlapped on entering the first cylindrical lens array of the homogenizer and line projector.

FIG. 20A is a Y-axis view schematically illustrating yet another embodiment of a homogenizer and line projector in accordance with the present invention including a homogenizer in the form of an input reflecting device having an array of elongated plane reflecting surfaces with edges thereof contiguous and aligned parallel to the X-axis and with the surfaces being inclined to each other in the Y-axis, the homogenizer being followed by projection optics including a Y-axis positive cylindrical lens and an aberration corrected a spherical doublet lens.

FIG. 20B is an X-axis view of the homogenizer and line projector of FIG. 20A.

FIG. 21 is a three dimensional view schematically illustrating further detail of the plane reflecting surface array of FIG. 20A.

DETAILED DESCRIPTION OF THE INVENTION

Figures 4A, 4B:
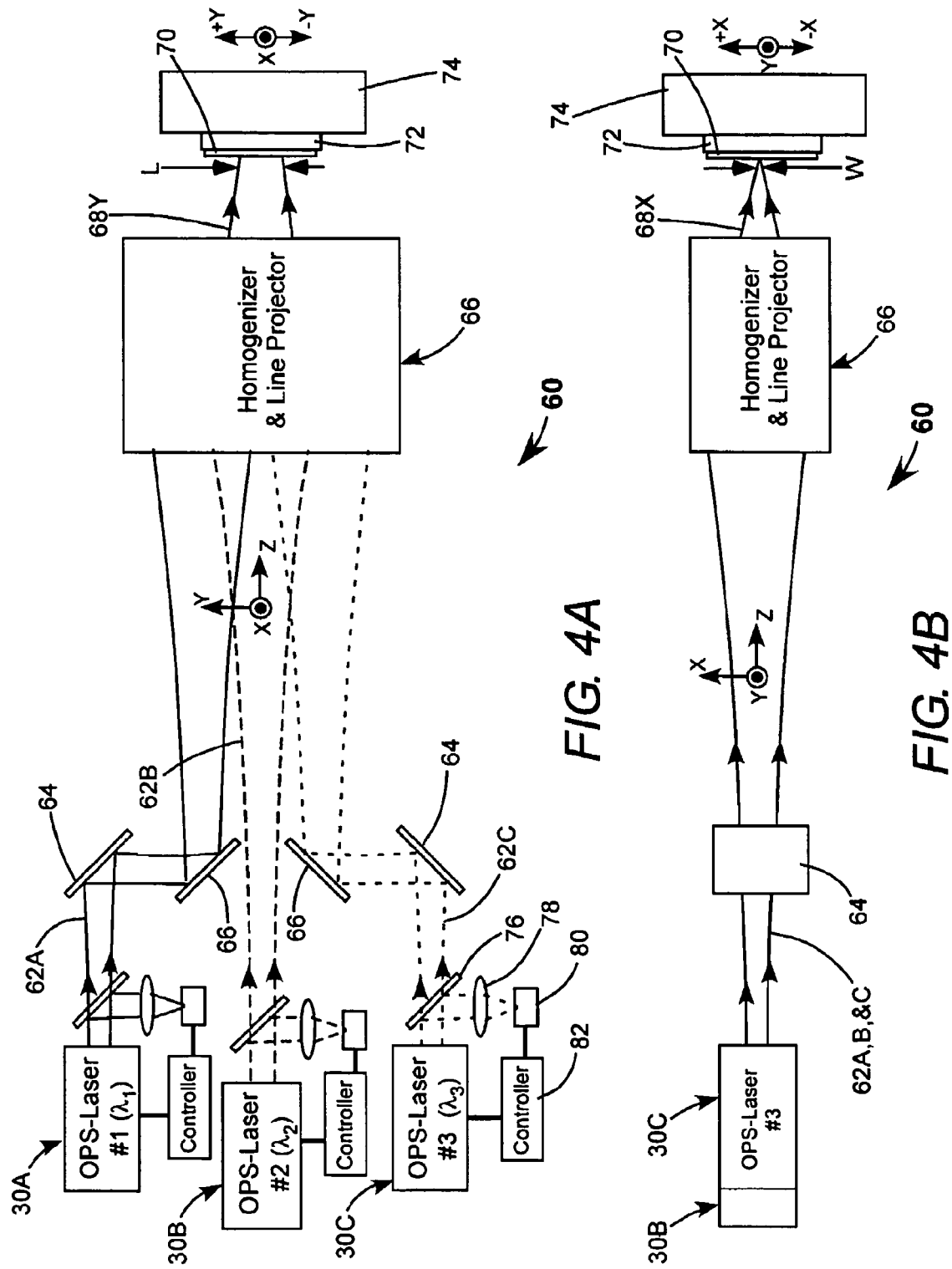
FIG. 4A schematically illustrates, in one transverse axis (the Y-axis), one preferred embodiment of a silicon crystallization apparatus in accordance with the present invention including a plurality of OPS-lasers delivering a corresponding plurality of beams propagating generally parallel to each other, aligned along the Y-axis, and overlapping at the entrance of a optical homogenizer and line projector in accordance with the present invention.
FIG. 4B schematically illustrates the apparatus of FIG. 4A in a second transverse axis thereof (X-axis) perpendicular to the first transverse axis.

Referring now to the drawings, wherein like components are designated by like reference numerals, FIG. 1 schematically illustrates a prior-art frequency-doubled OPS-laser 20. A plurality of lasers of this type is deployed in embodiments of apparatus in accordance with the present invention discussed hereinbelow. Laser 20 includes an optically pumped semiconductor (OPS) structure 24 including a mirror-structure 26 surmounted by a gain-structure 28. Gain-structure 28 includes active layers separated by half-wavelengths of the emission (fundamental) wavelength by one or more separator layers. The composition of the active layers is selected to provide radiation having a fundamental wavelength that can be frequency doubled to provide light of a selected wavelength between about 450 nm and about 575 nm. By way of example, for active layers of an $In_xGa_{(1-x)}As_yP_{(1-y)}$ composition, where $0 \leq x \leq 1$ and $0 \leq y \leq 1$, fundamental emission wavelengths between about 900 nm and 1150 nm can be achieved by selection of appropriate proportions for x and y. In one example of such a structure, active layers of $In_xGa_{(1-x)}$ As can provide an emission (fundamental) wavelength of about 976 nm, which can be intra-cavity frequency doubled to provide an output wavelength of 488 nm. The peak emission wavelength is temperature tunable by about 0.2 nm per ° C. OPS-structures suitable for use in frequency-doubled OPS-laser 20 are available from Coherent Tutcore OY, of Tampere, Finland.

OPS-structure 24 is supported in thermal contact with a heat sink 26 and is located in a folded resonator 38 formed between a mirror 40 and mirror-structure 26 of the OPS-structure. The resonator is folded by a fold-mirror 44. Mirror-structure 26 and mirror 40 each have maximum reflection at the emission wavelength of the gain-structure. Mirror 40 also has maximum reflectivity at the second-harmonic wavelength (half the emission wavelength). Fold-mirror 44 has maximum reflection at the emission wavelength of the gain-structure and maximum transmission at the second-harmonic wavelength.

Gain structure 48 of the OPS-structure is optically pumped by pump light E delivered from a diode-laser array 30 via an optical fiber bundle 32. The pump light is focused by a lens 34 onto the OPS-structure. As a result of the optical pumping, fundamental radiation circulates in resonator 38 as indicated by arrows NIR. An optically nonlinear crystal 37, for example, an optically nonlinear crystal of a material selected from a group of materials including lithium borate (LBO), bismuth borate (BIBO), potassium niobate ($KNbO_3$), β-barium borate (BBO), cesium lithium borate (CLBO), and cesium borate (CBO), is arranged, here, for type-I phase matching. Second-harmonic (2H) radiation, designated by arrows G, is generated in a double pass of the fundamental radiation through optically nonlinear crystal 37. The 2H-radiation is plane polarized in the plane of the drawing, as indicated in FIG. 1 by arrows $P_G$. A birefringent filter 52 is located in resonator 38 and arranged to maintain the wavelength of fundamental radiation at a value for which optically nonlinear crystal 37 is phase-matched for optimum second-harmonic conversion. The second-harmonic radiation generated by crystal 37 is delivered from resonator 38 via fold-mirror 44.

An ability to provide a plurality of laser beams each having a slightly different wavelength from the others is useful in the present invention. The OPS-laser as noted above is particularly suitable for that purpose. A detailed description of high-power fundamental and frequency-converted OPS lasers is presented in U.S. Pat. No. 6,285,702, assigned to the assignee of the present invention, and the complete disclosure of which is hereby incorporated by reference. The subject of selection of laser-beam wavelengths is discussed further hereinbelow.

Another characteristic of an OPS-laser is that the laser delivers a substantially symmetrical beam having a relatively low divergence and very high beam quality. By way of example between about 10 W and 15 W of second-harmonic output is available in a beam having an $M^2$ less than about 10.0 and a divergence of about 2.5 milliradians (mrad), i.e., about 0.15 degrees, measured across $1/e^2$ intensity points. The intensity distribution of such a beam on leaving an OPS-laser is schematically illustrated, in three-dimensional graph form, in FIG. 2. The distribution is Gaussian, or at least near Gaussian (quasi-Gaussian), in both (X and Y) transverse axes, and the beam is an essentially round beam having a diameter of about 1.0 mm across the $1/e^2$ intensity points.

High beam quality is important in the present invention as a plurality of OPS-laser beams must be focused into a line-of-light having a very high aspect-ratio (length to width), for example an aspect-ratio of about 200:1 or greater. Further, the absolute width of the line is preferably less than about 50 micrometers (μm), and more preferably less than 10 μm. In apparatus in accordance with the present invention, a line width of less than about 5.0 μm, i.e., about twice the diffraction limit for the laser-radiation wavelength, is achievable. The importance of a narrow linewidth in the present invention is also discussed further hereinbelow.

A desirable intensity (incoherent irradiance) distribution in a projected line is schematically illustrated, in three-dimensional graph form, in FIG. 3. Here, the visible aspect-ratio of the line is adjusted for convenience of illustration, but the actual magnitude of the aspect-ratio can be appreciated from the X (micrometers) and Y (millimeters) scales of the graph. Note that the Gaussian distribution of the OPS-laser beams is preserved in the X-axis direction. This can be achieved with a suitably aberration corrected (nearly diffraction limited) optical system. The intensity distribution in the Y-axis is preferably as near uniform as possible over the length of the line, with intensity fall off at the ends of the line, usually, preferably being as steep as possible.

FIG. 4A and FIG. 4B schematically illustrate one preferred embodiment 60 of silicon layer crystallization apparatus in accordance with the present invention. Apparatus 60 includes a plurality of OPS-lasers preferably but not necessarily similar to above described laser 30. Here, for simplicity of illustration, only three such lasers 30A, 30B, and 30C are depicted. In a practical apparatus as many as fifteen such lasers may be required, principles of the present invention, however, can be appreciated by one skilled in the art by considering only two or three lasers. It should be noted that while frequency-doubled lasers are presently preferred for generating wavelengths less than 575 nm, future development may make available OPS-lasers where radiation having a wavelength less than 575 nm can be generated directly (as fundamental radiation) with comparable power and efficiency.

Lasers 30A-C emit beams 62A-C respectively. Preferably, each laser emits radiation at a different wavelength from that emitted by another to minimize the possibility of interference effects, i.e., speckle, in a projected line of light. Here, the different wavelengths are designated λ1, λ2, and λ3. A suitable separation of wavelengths is about 5.0 nm. As, in this case, the laser output is frequency-doubled (second-harmonic) output, fundamental wavelengths must be different by about 10 nm. The gain-structure of an OPS-laser has a broad gain-bandwidth. By way of example, a structure having a peak-gain at 980 nm has a gain-bandwidth of about 45 nm FWHM. This means that an OPS-laser 980 nm structure can be operated, by suitable tuning of BRF 52 (see FIG. 1) at 970, 980, and 990 nm wavelengths to provide corresponding 2H outputs of 485 nm, 490 nm, and 495 nm, with gain for the 970 nm and 990 nm wavelengths not being significantly less than the peak-gain of the gain-structure. As beams from a plurality of lasers are combined in the present invention, there is no need to squeeze out every last milliwatt from any one laser.

OPS-laser gain structures are currently made with fundamental emission at around 976 nm for fiber-laser pumping and around 920 nm and 1060 nm for frequency doubling to respectively 460 nm and 530 nm for use as respectively blue and green light sources in displays. Given that in any batch of OPS-structures (chips) that are produced for any of these applications, because of process non-uniformity, there are chips that have peak gain at wavelengths up to 20 nm or more from the desired peak-gain wavelength. Accordingly, it is not a problem to find relatively inexpensive chips to provide as many as 15 to 20 second-harmonic wavelengths different from each other by about 5 nm, without special development. Solid-state lasers such as Nd:YAG and Nd:YVO$_4$ lasers will only provide one wavelength (about 1064 nm) with an acceptable degree of efficiency. Diode-lasers exist that can provide blue wavelengths exist, but these are relatively low power devices and emit poor-quality, asymmetrical, astigmatic beams.

Continuing with reference to FIGS. 4A and 4B, turning-mirrors 64 and 66 associated with OPS-lasers 30A and 30C are used to align beams 62A and 62C parallel to beam 62B from OPS-laser 30B. The spacing between the parallel aligned beams is selected such that the beams begin to overlap when the diameter of each the beams has expanded to about 5.0 mm from an initial diameter of about 1.00 mm. The 5.0 mm beam diameter should not be considered limiting but is selected, here, arbitrarily, as being about equal to the desired length of the projected line. At the above-exemplified beam divergence of about 2.5 mrad, a path length of about 1.5 meters for each beam is required to achieve to overlap condition. The beam divergence is exaggerated in FIGS. 4A and 4B for convenience of illustration.

In this embodiment of the inventive apparatus, the beams are partially overlapped on entering an optical homogenizer and line projector 66 in accordance with the present invention. Homogenizer and projector 66 projects Y-axis rays 68Y from the combined beams to form the length L of a line of light on a silicon layer 70 supported on a substrate 72. X-axis rays 68X are focused by the homogenizer and projector to provide as narrow as possible a width W for the line of light. Substrate 72 is mounted on a translation stage 74 that can be translated in the X and Y axes to raster-scan the line of light over the silicon layer to crystallize an extended area thereof.

Also in this embodiment of the inventive apparatus, it is preferable, for reasons that are discussed with reference to a preferred embodiment of the homogenizer and line projector described in detail further hereinbelow, to provide an arrangement for controlling the power of each of the plurality of OPS-lasers 30. In apparatus 60 a beam sampler 76 directs a sample of the beam emitted by the laser to a lens 78 that focuses the beam sample onto a detector 80. A controller 82 interprets the output of the detector as a measure of laser output power and adjusts pump power to the laser to maintain the output power at a predetermined level.

FIG. 5A and FIG. 5B are respectively Y and X-axis views schematically illustrating operating principles of a preferred embodiment 66A of an optical homogenizer and line projector in accordance with the present invention. The drawing is not to scale. The dimensions of components depicted are selected to allow an adequate ray trace to be illustrated with minimum confusion.

Homogenizer and line projector 66A is depicted as being illuminated by only two Y-axis overlapping beams (Beam 1 and Beam 2) bounded respectively by a solid bold line and a long-dashed bold line. The beams are depicted as being essentially collimated, and on the scale of homogenizer and beam combiner, the beams can be treated from an optical design standpoint as being essentially collimated, because of the very low divergence (about 2.5 mrad) thereof.

Homogenizer and line projector 66A includes an array 86 of cylindrical lenses 88 having optical power in the Y-axis only, and an array 90 of cylindrical lenses 88 having optical power in the Y-axis only. Preferably, lenses in the arrays have the same focal length and the arrays are spaced apart in the Z-axis (propagation-axis) direction by a distance about equal to this focal length. The cylindrical lenses have cylindrical axes thereof parallel to the X-axis. The cylindrical lens arrays are followed by an aberration-corrected spherical lens 94, here a positive cemented doublet lens. Lens 94 includes a bi-convex positive lens element 96 and a concave meniscus negative lens element 98, but this should not be considered as limiting the invention.

FIG. 6 is a graph schematically illustrating the intensity (irradiance) along the Y-axis of Beam 1 and Beam 2 and the combination thereof in an entrance plane 84 of the homogenizer and line projector immediately preceding (in the direction of beam propagation) cylindrical lens array 86. Each beam illuminates more than one cylindrical lens 88 in array 86 thereof. Array 66 essentially divides the beams in the Y-axis into as many beam-portion (beamlets sub-beams) as there are lenses in the array. One sub-beam is designated by single weight solid lines, another is designated by single weight long-dashed lines, and the third is designated by single weight dotted lines.

The rays in any one of the sub-beams leaving a lens 88 in array 86 are focused sufficiently close to a corresponding lens 92 in array 90 that all the rays in the sub-beam pass through that lens 92 and the divergence of the beams leaving that lens is only slightly reduced. Lens 94 projects those rays through a Y-axis exit pupil 100 of the homogenizer in a focal plane 102 of lens 94 with the rays filling the pupil. The same is true for the other sub-beams as is evident from the ray trace. Tracing one bold solid line and one bold dotted line through the homogenizer and line projector also indicates that all rays each of the original beams also fill pupil 100. As cylindrical lenses in lens arrays 86 and 90 do not having any optical power in the X-axis, X-axis rays of beams 1 and 2 proceed, essentially collimated, to spherical lens 94 and are focused in focal plane 102 of the lens.

When a silicon layer is aligned in plane 102, there will be a line-of-light 104 on the layer having a length in the Y-axis and a width in the X-axis. The intensity (incoherent irradiance) along the length of line 104 will appear about as depicted in the graph of FIG. 7. In the X-axis the line will have an about Gaussian distribution that would not be visible on the scale of FIG. 7.

FIG. 8A and FIG. 8B are respectively Y-axis and X-axis views schematically illustrating a design example of the homogenizer and line projector 66A of FIGS. 5A and 5B but with components and spacings thereof relatively to scale and with each of the cylindrical lens arrays including ten cylindrical lenses. FIG. 9 is a graph schematically illustrating computed incoherent irradiance in the Y-axis in entrance plane 84 of five symmetrical, Gaussian, OPS-laser beams overlapping in plane 84 of the homogenizer and line projector. FIG. 9 is a graph schematically illustrating computed incoherent irradiance in the Y-axis in focal plane 102 of doublet lens 94.

In the computation, it is assumed that the cylindrical lenses in the arrays thereof have equal radius of curvature equal to about 77 mm and are made from BK-7 optical glass. The cylindrical lenses are assumed to have a Y-axis height (aperture) of about 5 mm. Lens 94 is assumed to be a stock achromatic doublet lens having an effective focal length of 150 mm. No interference effects are assumed.

The incoherent irradiance in the graph of FIG. 9 indicated a (non) uniformity of about 3%. It is believed, however, that a (non) uniformity better than 2% would be indicated were more rays traced through the components of the homogenizer. Computations indicate that the X-axis $1/e^2$ line width is less than about 1.0 μm, i.e., essentially diffraction limited. The long focal length and small Y-axis aperture of the cylindrical lenses provides that the lens arrays introduce sufficiently little wavefront distortion in the X-axis that the homogenizer has near diffraction limited performance in the X-axis. This is important in minimizing line the X-axis line width to maximize incoherent irradiance.

It should be noted that the irradiance distribution of the combined beams entering the lens is not critical. Indeed, in the computed example, there is a periodic peak-to-peak variation of about 30%. It is only necessary that sufficient "pre-homogenizing" of the input illuminating be carried out to make the task of the homogenizer and line projector simpler. Clearly, the beam overlap and beam widths could be controlled to provide an input intensity having significantly less than 10% variation of incoherent irradiance along the Y-axis, but it is not clear how much improvement in uniformity in the Y-axis irradiance in plane 102 would result. If the beams did not overlap, or were of different individual irradiance, a less than maximized Y-axis irradiance-uniformity could be expected. Similarly, if the beams overlapped to such an extent that the combined irradiance distribution had a round-topped form, a less than maximized Y-axis irradiance-uniformity could also be expected. There is also tolerance of Y-axis irradiance uniformity to changes in the power of individual beams. Closed loop control of power in the individual beams is recommended, however, for providing that the absolute irradiance in the projected line is near constant as possible.

What it is important to realize is that the optical system of the homogenizer and line projector is not an imaging optical system. The lens arrays create uniformity by breaking up the input distribution into parts and superimposing the parts in the line. Accordingly, it is not necessary to create, at the entrance to the system, the intensity distribution that is required in the projected line. If a very high uniformity, for example within less than about 2%, is required, it is recommended that beam power and overlap be controlled such that light entering the homogenizer has a combined intensity that is close to flat-topped.

FIGS. 11A and 11B are respectively Y-axis and X-axis views schematically illustrating another embodiment 66B of a homogenizer and line projector in accordance with the present invention. This embodiment is configured to deal with a an input illumination that is provided by a plurality of beams of significantly different peak intensity. Homogenizer and line projector 66B includes cylindrical lens arrays 86 and 90 cooperative with an aberration corrected lens, essentially, homogenizer and line projector 66A. In addition, however, homogenizer and line projector 66B includes a pre-homogenizer 108 configured for eliminating gross non-uniformities in a plurality of input beams.

Pre-homogenizer 108 includes an array 110 of Y-axis cylindrical lenses 112 and an array 114 of Y-axis cylindrical lenses 116. Preferably the cylindrical lenses in the arrays have the same focal length and are spaced apart by a distance about equal to that focal length. Following lens array 114 in the direction of propagation of radiation through the system is a Y-axis positive cylindrical lens 118 having an aperture sufficiently large to collect all rays exiting lens array 114. Cylindrical lens 118 is spaced apart by a distance equal to about the Y-axis focal length thereof from Y-axis cylindrical lens array 86.

The drawings of FIGS. 11A and 11B are not to scale, only two input beams (Beam 1 and Beam 2) are shown, lens arrays include only three lenses each, and only sufficient rays are traced to indicate operating principles of the optical system to one skilled in the art. Actual dimensions and optical configurations can be envisaged by reference to FIGS. 8A and 8B discussed above. In this embodiment, it is also advisable to make the numerical aperture of the lenses in lens arrays 110, 114, 84, and 96 sufficiently low that no significant X-axis beam aberration is introduced thereby. In that case, as the arrays do not have any X-axis optical power, lens 94 can be optically corrected to prove near diffraction-limited performance, and correspondingly minimized line width in the X-axis.

Figure 12:
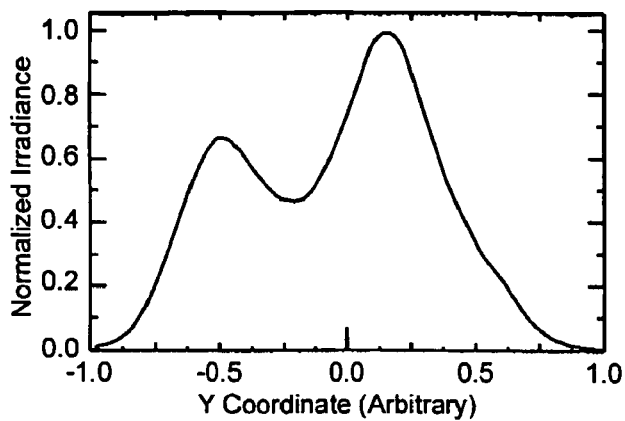
FIG. 12 is a graph schematically illustrating estimated transverse intensity distribution in the Y-axis direction of a combination of four partially overlapped Gaussian OPS laser beams in a transverse plane immediately preceding a first of the spaced-apart cylindrical lens arrays of the pre-homogenizer of FIGS. 11A and 11B.
Figure 13:
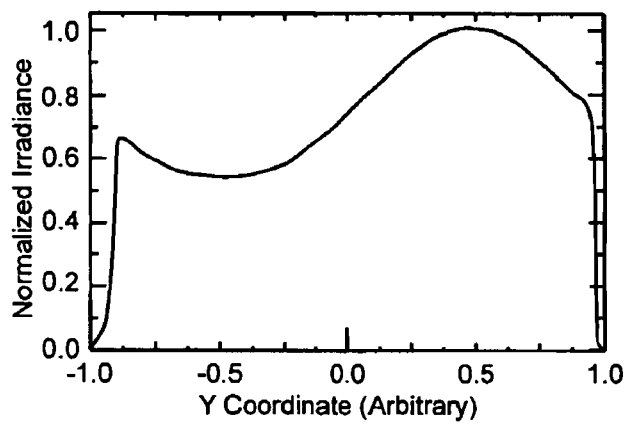
FIG. 13 is a graph schematically illustrating estimated transverse intensity distribution in the Y-axis direction of a combination of four partially overlapped Gaussian OPS laser beams in a transverse plane immediately preceding a first of the spaced-apart cylindrical lens arrays of the homogenizer of FIGS. 11A and 11B.
Figure 14:
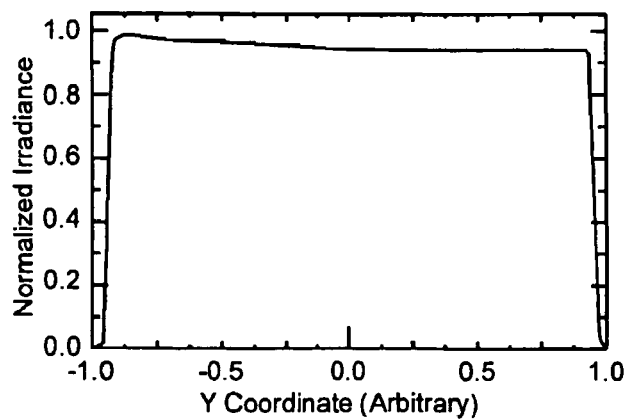
FIG. 14 is a graph schematically illustrating estimated transverse intensity distribution in the Y-axis direction of a line of light projected by the pre-homogenizer, and homogenizer and line-projector of FIGS. 11A and 11B from the four partially overlapped Gaussian beams of FIG. 12.

FIG. 12, FIG. 13, and FIG. 14 are graphs schematically illustrating the action of pre-homogenizer 108 in homogenizer and line projector 66B. The graphs are estimates only and are mathematically derived from plotted and fitted functions. FIG. 12 depicts Y-axis irradiance distribution of an arbitrary, very non-uniform combination of four Gaussian beams, with peak irradiances thereof varying by more than a factor of three, overlapping in plane 109 of homogenizer and line projector 108 of FIGS. 11A and 11B. FIG. 13 is the estimated Y-axis irradiance distribution in plane 84 of the homogenizer and line projector. Peak-to-peak modulation here has been reduced to about 40%. FIG. 14 is the estimated Y-axis irradiance distribution in plane 102 of the homogenizer and line projector. Here peak-to-peak modulation has been reduced to about 6%. In making the estimates, it was assumed that there were only three cylindrical lenses per array in arrays 110, 114, 86, and 94. Some improvement in the uniformity of irradiance distribution can be expected if these arrays have a greater number of lenses per array.

In the description of the inventive annealing apparatus 60 presented above, the desirability of operating the OPS-lasers at different wavelengths for minimizing the possibility of coherence effects is discussed. An additional step that can be taken to reduce such effects is to combine beams having the same wavelength but which are plane-polarized perpendicular to each other. FIG. 15 is a Y-axis view schematically illustrating another embodiment 120 of OPS-laser silicon crystallization apparatus in which this step is embodied.

In apparatus 120 there are two OPS-lasers 30A and 30B. The lasers are arranged aligned parallel the Y-Z plane. The output beam of each laser is assumed to be plane-polarized in a plane parallel to the Y-Z plane (vertically polarized) as indicated by arrow $P_V$. The polarization plane of the output beam of each laser is rotated by 45° by a polarization rotator 122. Beamsplitter surface 124 of a polarizing beamsplitter cube 126 resolves the beam into two portions. A transmitted portion indicated by solid lines is vertically polarized (arrow $P_V$) and a reflected portion indicated by long-dashed lines is horizontally polarized as indicated by arrowhead $P_H$. Turning mirrors 128 guide the horizontally polarized beam portions parallel to the vertically beam portions such that four beam portions overlap at the entrance to homogenizer and line projector 66 for projecting a line of light with uniform irradiance in the Y-axis as discussed above.

Those skilled in the art will recognize that there are other arrangements that can provide parallel beams plane-polarized perpendicular to each other. By way of example, in the arrangement of FIG. 15 the rotators 122 can be omitted and the polarization plane of the output beams of the lasers arranged to be at 45° to the Y-Z plane. Alternatively, the rotators and the beamsplitters can be omitted and two pairs of OPS-lasers can be provided, with one pair having an output wavelength $\lambda_1$ and the other having an output wavelength $\lambda_2$. In each pair, the OPS-lasers can be arranged such that one OPS-laser emits an output beam that is vertically polarized and the other OPS-laser emits a beam that is horizontally polarized. Referring again to FIG. 1, the polarization orientation of the laser output is determined by the orientation of BRF 52 and the corresponding orientation and phase matching type of optically nonlinear crystal 37. An arrangement including vertically and horizontally polarized OPS-lasers can, of course, include more than 4 OPS-lasers.

Figure 16:
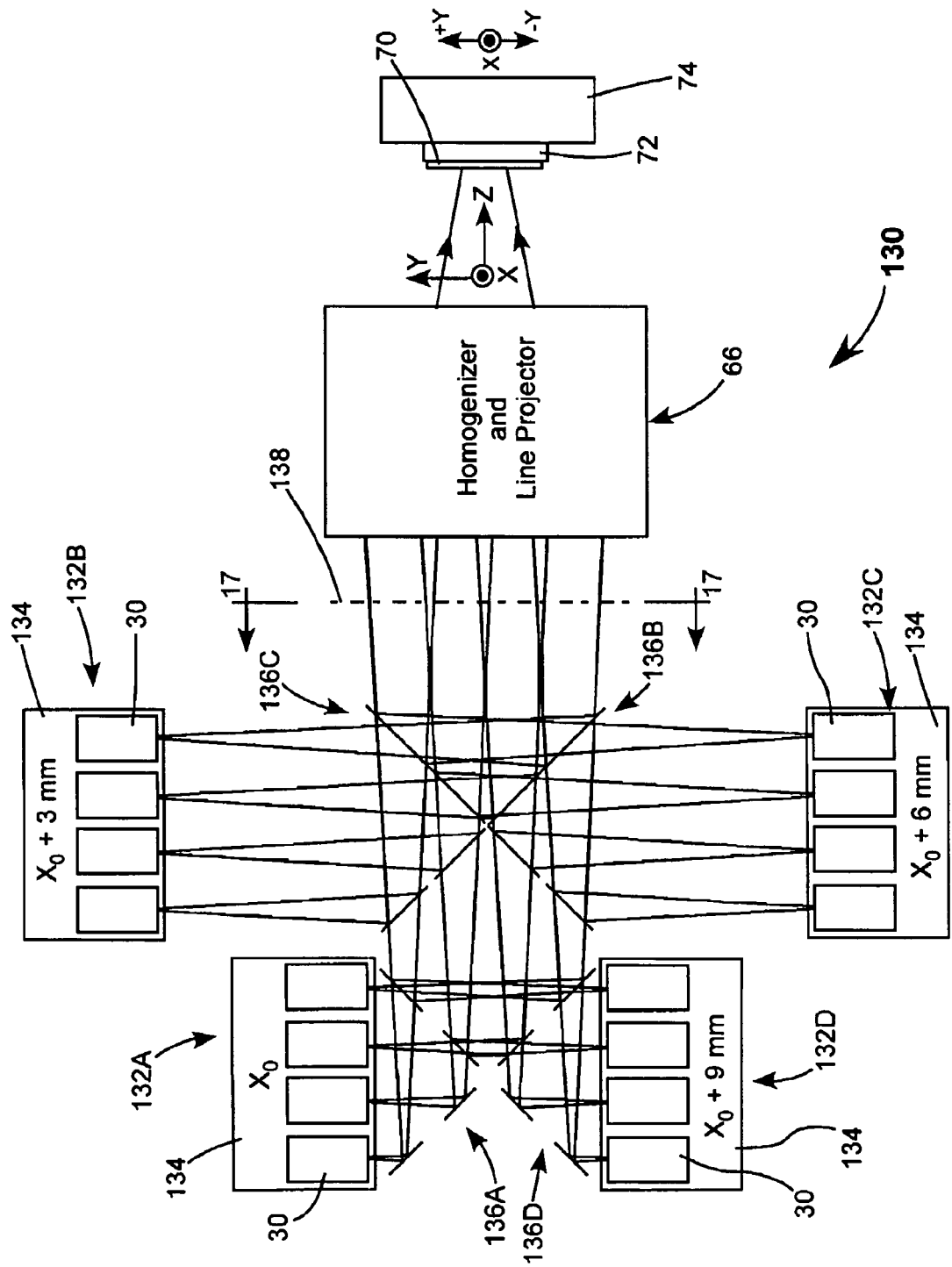
FIG. 16 is a Y-axis view schematically illustrating yet another preferred embodiment of silicon crystallization apparatus in accordance with the present invention, including sixteen OPS-lasers arranged in groups of four at different heights in the X-axis, and such that the sixteen beams emitted by the OPS lasers are directed, in a parallel array four beams high by four beams wide, into a homogenizer and line projector in accordance with the present invention.

FIG. 16 is a Y-axis view schematically illustrating yet another embodiment 130 of silicon crystallization apparatus in accordance with the present invention. Apparatus 130 includes four groups 132A, 132B, 132C, and 132D of OPS-lasers 30. Each group of lasers is mounted on a separate chill-plate 134 for cooling. Output beams of the OPS-lasers in each group are aligned with each other, parallel to the Y-axis, and propagating in the same general direction. The Y-axis aligned beams in each OPS-laser group are at different heights in the X-axis. By way of example, when group 132A is at a nominal height $X_0$, group groups 132B, 132C, and 132D are at heights of $X_0+3$ mm, $X_0+6$ mm, and $X_0+9$ mm, respectively. Turning-mirror groups 136A, 136B, 136C and 136D, preferably with mirrors therein individually alignable, direct beam-groups from OPS-laser groups 132A, 132B, 132C, and 132D, respectively, parallel to each other such that all 16 beams propagate in a 4×4 matrix thereof, with beams aligned in the X-axis and in the Y-axis. FIG. 17 schematically illustrates the beam matrix as it would appear in a plane 138 of FIG. 16. The beam matrix propagates with beams increasingly overlapping, due to the slight divergence thereof, into a homogenizer and line projector in accordance with the present invention. An embodiment of such a homogenizer and line projector 66C is schematically illustrated, relatively about to scale, in FIG. 18. FIG. 18 is a Y-axis view, the X-axis view will evident to one skilled in the art from a comparison with FIGS. 8A and 8B.

Homogenizer and line projector 66C is similar to the homogenizer and line projector 66A of FIGS. 5A-B with an exception that lens 94 of homogenizer and line projector 66C includes two doublet elements 94A and 94B rather than one. This is simply for the convenience of being able to use catalog stock lenses, rather than a purpose-fabricated doublet lens.

FIG. 19 is a graph schematically illustrating computed incoherent irradiance along the Y-axis for one example of the homogenizer and line projector 66C. In this example cylindrical lens 88 and 92 in arrays 86 and 90 thereof are assumed to have a focal length of about 150 mm and are spaced apart by about 150 mm. Lens 94 is a lens group available from CVI Inc. of Albuquerque, N. Mex. as Part Number FAP-150.0-60.0. In the calculation, a 4×4 beam matrix is assumed to have almost completely overlapped beams at plane 84 of FIG. 17, with the dimension (diameter) of the overlapped matrix being about 50 mm. This is not the optimum overlap condition for completely optimized uniformity in the Y-axis of the projected line but the compromise was made to enable a large, here, 60 mm-diameter, lens 94 to be used for minimizing the line width. The computed line width (X-axis dimension) is about 2.0 µm.

In embodiments of homogenizer and line projectors discussed above, beam homogenization is achieved by overlapping beam portions created by face-to-face arrays of Y-axis cylindrical lenses. FIG. 20A and FIG. 20B are respectively Y-axis and X-axis views schematically illustrating an embodiment 66D of a homogenizer and line projector in which beam homogenizing is provided by a single array 140 of elongated rectangular reflective surfaces 142. Further detail of array 142 is depicted in FIG. 21. In FIG. 20A and FIG. 21 four reflective surfaces are depicted for simplicity of illustration. The surfaces are aligned parallel to the X-axis, preferably with longitudinal edges of the surfaces contiguous as illustrated. The surfaces have different, non-orthogonal inclinations to the Y axis and to each other. The arrangement of surfaces can be made from individual strip reflectors or the reflective surfaces may be a strip-faceted surface of a single element.

A combination of three partially overlapped beams, here three, propagating parallel to the Z-axis is incident on the reflective surfaces. The overlapping is preferably selected such that the combination of beams at the reflective surfaces has an about flat-topped intensity distribution as discussed above. The extent of the overlap and the input intensity distribution, however, is not critical, also as discussed above.

The combination of beams can be considered from an optical design standpoint as being substantially collimated as the beam divergence is only a few milliradians. The inclinations of reflective surfaces 142 to the Y-axis are selected such that the substantially collimated beam combination is divided in the Y-axis into four substantially collimated beam-portions propagating at an angle to each other and to the Z-axis. These four portions are depicted in FIG. 20A by solid lines, long-dashed lines, medium-length-dashed lines, and short-dashed lines, to more clearly illustrate the beam homogenizing action. The inclinations of reflective surfaces 142 to the Y-axis are further selected such that the beam portions exactly overlap in a plane 144. A lens group 146 including a Y-axis positive cylindrical lens 148 and an aberration corrected doublet lens 150 is configured to project an image of plane 144 in a plane 152 which is about the rear focal plane of doublet lens 150. Positive cylindrical lens 148 is located at about a focal length thereof from plane 144. The image is the required line of light 104 with a length in the Y-axis and width in the X-axis. X-axis rays are focused by doublet 150 to provide the required very narrow line-width as depicted in FIG. 20B.

The intensity or irradiance distribution along the Y-axis in line 104 will be essentially the reverse of the intensity distribution in the Y-axis at plane 144. An aperture stop 154 can be optionally positioned at plane 144 to "clip" the ends of the homogenized beam in the Y-axis so that the irradiance distribution in line 104 falls off a steeply as possible at the ends of the line.

Figures 22, 23:
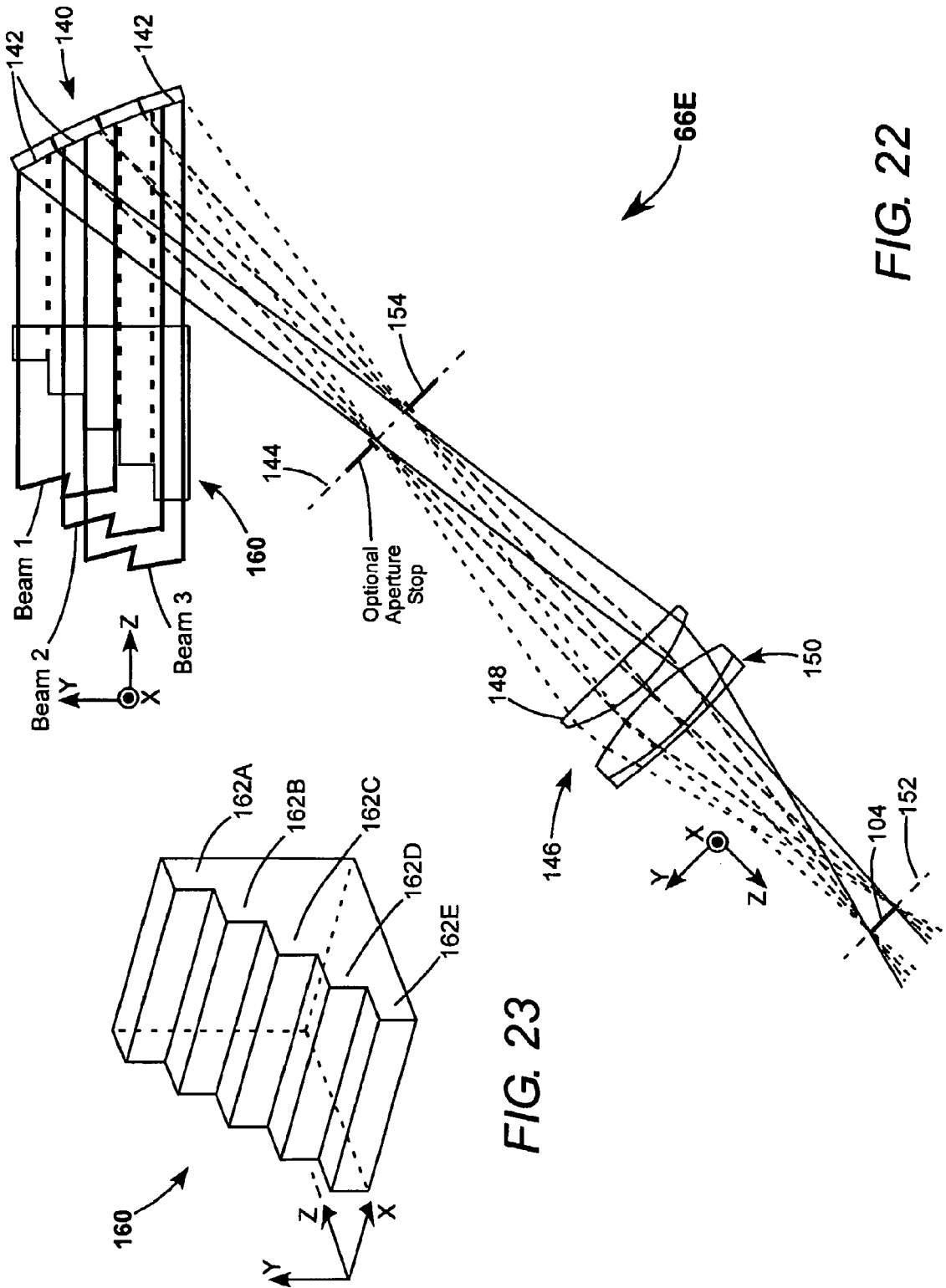
FIG. 22 is a Y-axis view schematically illustrating still another embodiment of a homogenizer and line projector in accordance with the present invention similar to the embodiment of FIGS. 20A and 20B but further including a stepped prism ahead of the input reflecting device and arranged to divide overlapping input beams into a plurality of beam portions having different path lengths.
FIG. 23 is a three-dimensional view schematically illustrating details of the stepped prism of FIG. 22.

FIG. 22 and FIG. 23 schematically illustrate still another embodiment 66E of a homogenizer and line projector in accordance with the present invention. This embodiment is similar to the embodiment of FIGS. 20A and 20B, with an exception that a stepped prism 160 is located in the path of the overlapping input beams (Beam 1, Beam 2, and Beam 3) to cause different parts of the overlapping beams to travel different path lengths. Prism 160, in this example has five steps or sections 162A-E aligned parallel to the X-axis and parallel to the Z-axis. The prism may be a single element as illustrated or formed from a stack of plates optically bonded together.

Figure 24:
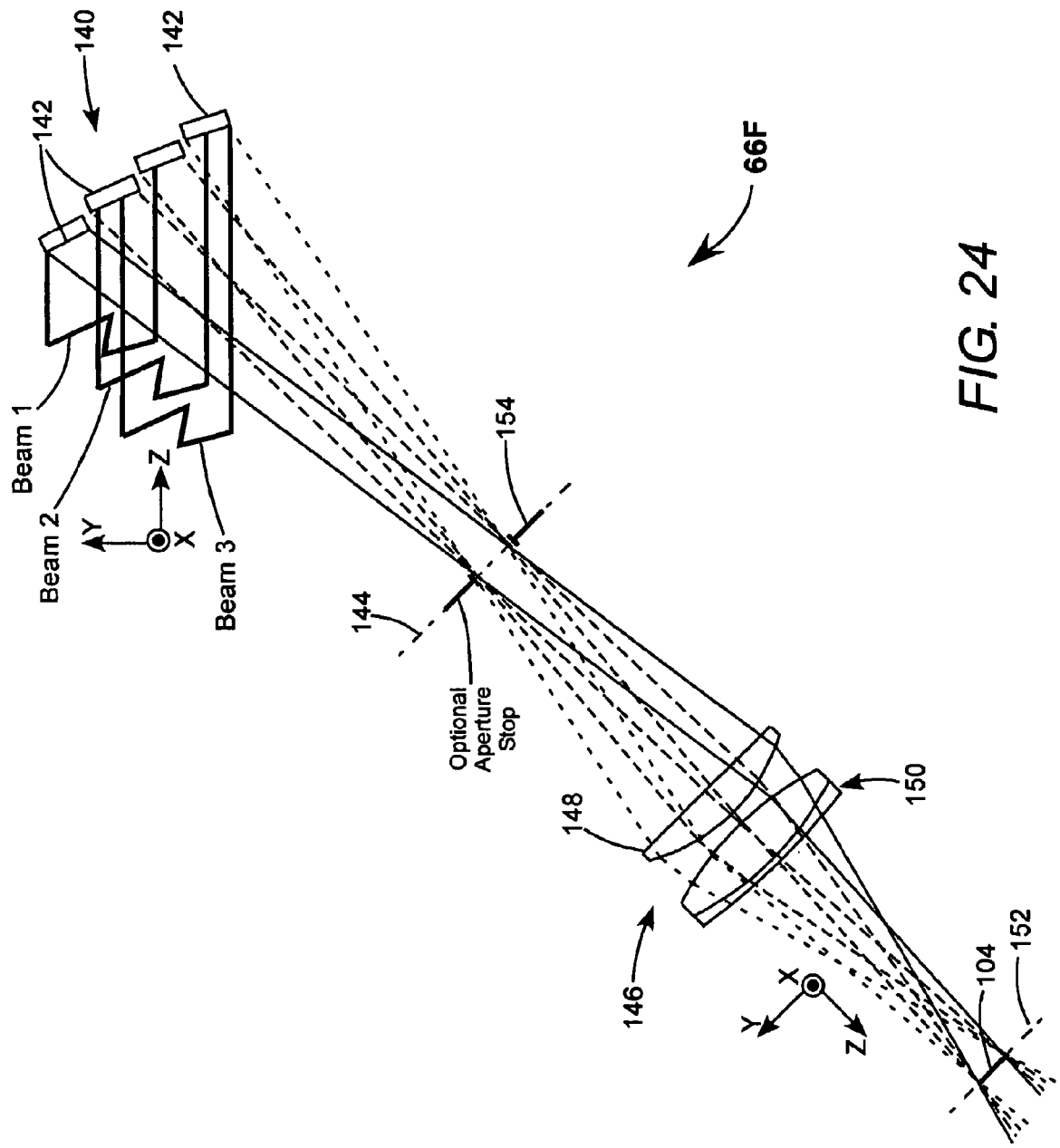
FIG. 24 is a Y-axis view schematically illustrating a further embodiment of a homogenizer and line projector in accordance with the present invention similar to the embodiment of FIGS. 20A and 20B but wherein the reflecting surfaces are not contiguous but are staggered in the Z-axis to direction to divide overlapping input beams into a plurality of beam portions having different path lengths.

The Z-axis length of the steps is selected such that path lengths through the prism (indicated in FIG. 23 by bold dotted lines) are different by at least about the coherence length for the wavelength of one of the laser beams, preferably for the longest wavelength beam in the combined beams. The coherence length is about 3.0 mm, for a longest wavelength of about 575 nm. FIG. 24 schematically illustrates a further embodiment 66F of a homogenizer and line projector in accordance with the present invention. This embodiment is similar to the embodiment of FIGS. 20A and 20B with an exception that reflecting surfaces 140 of array 142 thereof are staggered at different distances in the Z-axis direction. This provides the same path-difference effect created by the stepped prism in above-discussed homogenizer and line projector 66E.

Creating the path length difference in homogenizer and line projectors 66E and 66F provides an additional measure to minimize the occurrence of interference (speckle) effects in the projected line. It is recommended, however, in either case, that the primary measure speckle reduction measure be that of providing overlapping input beams having wavelengths different by 5 nm or more and orthogonally-opposed polarization-planes as discussed above.

It should be noted here that in any of the above described embodiments of homogenizer and line projectors the type of lenses used should not be considered limiting, and those skilled in the art may substitute other lens types having a similar function without departing from the spirit and scope of the present invention. By way of example a spherical lens may be replaced by two crossed cylindrical lenses, i.e., one having power in only the X-axis and the other having power in only the Y-axis, or a single lens having crossed cylindrical surfaces. Lenses should not be considered as being limited to having the number of elements therein described above. Further, the term "spherical" lens means only that the lens has equal optical power in both X- and Y-axes. Such a lens may have one or more aspheric surfaces for optimizing correction of optical aberrations as is known in the art.

In summary, a method of effecting crystallization of an amorphous silicon layer on a transparent substrate by irradiating the silicon layer with beams of CW radiation from a plurality of OPS-lasers is described. The beams are combined into a common area, preferably in the form of a line or strip having a very high aspect ratio (length-to width). The layer is moved (scanned) relative to the line or strip such that the dwell time of the strip on the layer in any one location on the layer is only sufficient to crystallize the layer at that location. Scanning in a raster pattern, for example, also provides that crystallization can be effected over an extended region of the layer.

Various embodiments of inventive optical apparatus are described for carrying out the inventive crystallization method. The embodiments of the apparatus include arrangements for combining beams from the OPS-lasers in one or two dimension arrays in which the beams progressively overlap. The beam overlap can be arranged to form, in a selected plane, a combination of the beams which has a quasi-uniform irradiance distribution in the direction of the length of the line. Various inventive homogenizing and line projection optical arrangements are described that further homogenize the quasi-uniform beam combination and project the beam combination to form the line or strip of light.

It is emphasized here that the method of the present invention is not limited to the apparatus embodiments and examples thereof described and depicted herein. Rather, the invention is limited only by the claims appended hereto.

What is claimed is:

1. Apparatus for crystallizing a silicon layer supported by substrate in a working plane, the apparatus comprising:
   a plurality of external-cavity, optically pumped, surface-emitting semiconductor (OPS) lasers arranged to generate a corresponding plurality of continuous wave laser-beams;
   a beam-homogenizer and line projector;
   an arrangement for propagating the beams along parallel paths such that each beam at least partially overlaps an adjacent beam in an entrance plane of the beam homogenizer and line projector transverse to the parallel paths to form a combined beam; and
   wherein the homogenizer and line projector is configured and arranged to divide the combined beam, in an axis transverse to the propagation direction, into a plurality of beam portions, and to project the beam portions into an elongated area in the working plane in a manner such that each of the beam portions essentially fills the elongated area and wherein the homogenizer and line projector have a longitudinal Z-axis and a Y-axis transverse to the Z-axis, and an X-axis transverse to the Z-axis and perpendicular to the Y-axis and wherein said arrangement propagates the beams along paths parallel to the Z axis of the homogenizer and line projector and wherein the homogenizer and line projector includes an array of elongated rectangular reflectors aligned parallel to the X axis and having a length in the X-axis, said homogenizer including a lens system and wherein the reflective surface array and the lens system are configured such that the reflective surface array divides the combined beam, in the Y-axis, into a plurality of beam portions and the lens system projects the beam portions into an elongated area in the working plane, with the elongated area having a length and width parallel to respective Y-axis and X-axis and with each of the beam portions essentially filling the elongated area.

2. The apparatus of claim 1, wherein the elongated area has a length parallel to the transverse axis and has a length-to-width aspect-ratio greater than about 200:1.

3. The apparatus of claim 2, wherein the elongated area has a width less than about 5 micrometers.

4. The apparatus of claim 3, wherein the combined radiation of the projected beam-portions in the elongated area is uniform to within about 5% of a nominal value.

5. The method of claim 1, wherein each of the laser beams has a wavelength less than about 575 nm.

6. The method of claim 5, wherein each of the laser beams has a wavelength between about 450 nanometers and 575 nanometers.

7. The method of claim 6, wherein the external-cavity, optically pumped, surface-emitting semiconductor lasers are external-cavity, intracavity frequency-doubled, optically pumped, surface-emitting, semiconductor lasers.

8. The apparatus of claim 5, wherein any one of the OPS-laser beams has a wavelength different from the wavelength of the others.

9. The apparatus of claim 8, wherein each of the OPS-laser beams has a wavelength different from the wavelength of each of the others.

10. The apparatus of claim 5, wherein two of the OPS-laser beams have the same wavelength and are plane-polarized, with the polarization plane of one of the two beams being perpendicular to the polarization plane of the other.

11. The apparatus of claim 1, wherein there are N OPS-lasers for generating N laser beams, and in the parallel paths the N laser beams are aligned in one row thereof parallel to the transverse axis.

12. The apparatus of claim 1, wherein there are M×N OPS-lasers for generating M×N laser beams, and in the parallel paths the beams are arranged in M rows of N beams with the beams in the rows of beams being aligned parallel to the transverse axis.

13. The apparatus of claim 1, wherein said lens system includes at least one cylindrical lens having optical power in the Y-axis only.

14. The apparatus of claim 13, wherein longitudinal edges of the reflectors in the reflector array are about contiguous.

15. The apparatus of claim 13, further including an optical element located in the parallel paths of the beams between the lasers and the homogenizer and line projector, the optical element having a plurality of rectangular sections aligned parallel to the Z-axis and parallel to the X-axis, having different lengths in the Z-axis, and arranged one on top of the other in the Y-axis with the thickness and number of sections selected such that the combined beam is intercepted by all of the sections.

16. The apparatus of claim 15, wherein the optical element is a solid element in the form of a stepped prism.

17. The apparatus as recited in claim 13, wherein said lens system includes a second lens having optical power in the Y-axis and in the X-axis.

* * * * *